United States Patent
Begley et al.

(10) Patent No.: US 8,057,733 B2
(45) Date of Patent: Nov. 15, 2011

(54) DOSING BOTTLE AND METHOD

(75) Inventors: Steven F. Begley, Seymour, IN (US);
Todd R. Johnson, Allyn, WA (US);
William J. Peek, Lawrenceville, GA
(US); Randal D. Porter, Norcross, GA
(US)

(73) Assignee: Silgan Plastics Corporation,
Chesterfield, MO (US)

( * ) Notice: Subject to any disclaimer, the term of this patent is extended or adjusted under 35 U.S.C. 154(b) by 146 days.

(21) Appl. No.: 12/003,300

(22) Filed: Dec. 21, 2007

(65) Prior Publication Data
US 2009/0159482 A1 Jun. 25, 2009

(51) Int. Cl.
*B29C 39/02* (2006.01)
*B29C 43/02* (2006.01)
*B29D 30/00* (2006.01)
*B29C 49/00* (2006.01)

(52) U.S. Cl. ........ 264/537; 264/500; 264/512; 264/523; 264/535; 264/539; 425/522; 425/526; 425/528; 425/532; 425/534

(58) Field of Classification Search .................. 264/523, 264/535, 537, 539, 500, 512; 425/522, 526, 425/528, 532, 534
See application file for complete search history.

(56) References Cited

U.S. PATENT DOCUMENTS

| | | | |
|---|---|---|---|
| 3,347,420 A | 10/1967 | Donoghue | |
| 3,581,953 A | 6/1971 | Donoghue | |
| 3,628,700 A | 12/1971 | Donoghue | |
| 4,070,140 A * | 1/1978 | Lucas et al. .................. 425/533 |
| 4,201,316 A | 5/1980 | Klingaman | |
| 4,451,426 A | 5/1984 | Branchadell | |
| 4,603,831 A | 8/1986 | Krishnakumar et al. | |
| D288,662 S | 3/1987 | Obuchowski | |
| 4,646,925 A | 3/1987 | Nohara | |
| 4,671,763 A | 6/1987 | Weiler | |
| 4,715,504 A | 12/1987 | Chang et al. | |
| 4,818,575 A * | 4/1989 | Hirata et al. .................. 428/36.7 |
| D304,681 S | 11/1989 | Metaxa | |
| 4,954,376 A | 9/1990 | Krishnakumar et al. | |
| D310,963 S | 10/1990 | Segati | |
| 4,971,226 A | 11/1990 | Donoghue | |
| D313,935 S | 1/1991 | Miller | |

(Continued)

OTHER PUBLICATIONS

U.S. Appl. No. 12/328,696, filed Dec. 4, 2008, Porter et al.

*Primary Examiner* — Christina Johnson
*Assistant Examiner* — Atul P Khare
(74) *Attorney, Agent, or Firm* — Reinhart Boerner Van Deuren s.c.

(57) ABSTRACT

A dosing bottle is made by injection molding a synthetic resin preform with a threaded neck finish portion and a body portion. The neck finish has an internal collar adjacent said lower end thereof. The preform is removed from the injection mold and inserted into the mold of a blow molding machine. The mold has a cavity with a body portion conforming to the desired configuration and dimensions for the body of the bottle and a neck portion closely conforming to the configuration and dimensioning of the neck portion of the preform. The preform is heated and inserted into the blow mold cavity with the neck finish portion of the preform being sealed from the body portion of the cavity. Air is introduced into the body portion of the preform to blow the body portion of the preform into conformity with the body cavity while precluding any distortion of the collar and of the neck finish.

6 Claims, 4 Drawing Sheets

U.S. PATENT DOCUMENTS

| | | | |
|---|---|---|---|
| D316,815 S | 5/1991 | Kalin et al. | |
| 5,049,349 A | 9/1991 | McCullough et al. | |
| D321,651 S | 11/1991 | Cochran | |
| D321,829 S | 11/1991 | Iazzetta | |
| D323,617 S | 2/1992 | Miller | |
| 5,122,325 A | 6/1992 | Bartley et al. | |
| D336,046 S | 6/1993 | Donoghue | |
| 5,255,889 A * | 10/1993 | Collette et al. | 249/102 |
| 5,330,081 A | 7/1994 | Davenport | |
| 5,364,585 A | 11/1994 | Takeuchi | |
| D353,324 S | 12/1994 | Rice, III | |
| D356,502 S | 3/1995 | Poandl | |
| D357,416 S | 4/1995 | Valentine | |
| 5,411,698 A * | 5/1995 | Mero et al. | 264/521 |
| D360,363 S | 7/1995 | Minale | |
| D360,831 S | 8/1995 | Boisset | |
| 5,447,766 A | 9/1995 | Orimoto et al. | |
| 5,588,544 A | 12/1996 | Takashima et al. | |
| D379,765 S | 6/1997 | Hencher | |
| D387,993 S | 12/1997 | Workman et al. | |
| D388,712 S | 1/1998 | Lyngdal et al. | |
| 5,735,420 A * | 4/1998 | Nakamaki et al. | 215/373 |
| 5,780,130 A | 7/1998 | Hansen et al. | |
| D400,434 S | 11/1998 | Amos et al. | |
| 5,888,598 A * | 3/1999 | Brewster et al. | 428/35.7 |
| 5,918,752 A | 7/1999 | Meyer | |
| 6,082,565 A | 7/2000 | Harrold | |
| 6,209,762 B1 | 4/2001 | Haffner et al. | |
| 6,217,819 B1 * | 4/2001 | Wunderlich | 264/513 |
| D450,597 S | 11/2001 | Bobchenok et al. | |
| 6,312,641 B1 | 11/2001 | Hutchinson | |
| D452,159 S | 12/2001 | Belser et al. | |
| 6,382,954 B1 | 5/2002 | Mai | |
| 6,568,156 B2 | 5/2003 | Silvers et al. | |
| 6,572,812 B2 | 6/2003 | Collette et al. | |
| D484,419 S | 12/2003 | Potocki et al. | |
| 6,673,303 B2 | 1/2004 | White et al. | |
| 6,681,548 B2 | 1/2004 | Silvers et al. | |
| D486,072 S | 2/2004 | Potocki et al. | |
| 6,709,624 B2 | 3/2004 | Lisch et al. | |
| D498,144 S | 11/2004 | Illenberger et al. | |
| D505,079 S | 5/2005 | Mulder et al. | |
| 6,890,621 B2 | 5/2005 | Nakamura et al. | |
| D511,460 S | 11/2005 | Deubel et al. | |
| D512,316 S | 12/2005 | Illenberger et al. | |
| 2002/0037338 A1 * | 3/2002 | Lisch et al. | 425/525 |
| 2003/0077349 A1 | 4/2003 | Derouault et al. | |
| 2006/0051451 A1 * | 3/2006 | Hutchinson et al. | 425/552 |
| 2006/0204694 A1 * | 9/2006 | Porter et al. | 428/35.7 |
| 2009/0085261 A1 | 4/2009 | Porter et al. | |

* cited by examiner

DOSING BOTTLE AND METHOD

BACKGROUND OF THE INVENTION

The present invention relates to dosing bottles for dispensing metered amounts of liquids stored therein.

Synthetic resin bottles are widely employed for storing various types of liquid. Such a bottle may include a fitment which will function to deliver a metered amount of the contents, and such bottles are frequently referred to as dosing bottles.

Generally, such bottles involve a fitment which seals the neck finish of the bottle.

To ensure delivery of the proper volume of liquid, it is important that the fitment be precisely positioned in the neck finish. To provide greater control of the dimensioning, the preforms are injection molded with a controlled neck finish portion, and the fitment must be positioned within the neck finish to control volume.

When the preform is inserted into the stretch blow mold, air is introduced under pressure to cause the side walls to blow outwardly. The blowing pressure can produce distortion of the injection molded neck finish, and any distortion will produce some variation in the amount of liquid which is intended to be dispensed in metered doses.

Moreover, some prior art dosing bottles employ fairly complicated structures to seat the fitment.

Accordingly, it is the object of the present invention to provide a method for making a dosing bottle wherein the neck finish of the bottle is closely controlled and protected against deformation.

It is also an object to provide such a method which is adaptable to different dosing volumes.

Another object is to provide a novel dosing bottle wherein the fitment can be securely positioned by friction and the volume of the doses is repeatable.

A preform can be molded to very close high tolerances, particularly with respect to the neck finish portion. By the process of the present invention, the preform is placed in the blow mold and the neck finish is sealed about its periphery so that the pressurized air does not effect any distortion of the neck finish.

The volume to be dispensed can be varied by the selection of fitments of various dimensions. The fitment firmly seats on an internal shoulder of the neck finish and the fitment is pushed downwardly so that its periphery frictionally engages in the neck finish.

The process of assembly is thus fairly simple and reliable as to placement of the next finish and the volume thereabove.

Thus, it can be seen that the method of the present invention is one which can be practiced readily and reliably to produce a dosing bottle in which the fitment is securely positioned within the neck finish, thus, ensuring the delivery of the desired volume of liquid in each dose.

SUMMARY OF THE INVENTION

It has now been found that the foregoing and related objects may be readily attained in a dosing bottle by injection molding a synthetic resin preform having a threaded neck finish portion and a body portion, the neck finish having an internal collar providing a peripheral shoulder adjacent the lower end thereof, and the preform is removed from the injection mold. A blow molding machine is provided with a blow mold having a cavity with a body portion conforming to the desired configuration and dimensions for the body of the bottle and a neck portion closely conforming to the configuration and dimensioning of the neck portion of the preform. The preform is heated and inserted into the blow mold cavity with the neck finish portion of the preform being sealed from the body portion of the body cavity. Air is introduced into the body portion of the preform to blow the body portion of the preform into conformity with the body cavity while precluding any distortion of the collar and of the neck finish.

Desirably, the blow mold includes separate elements seated in the mold cavity and abutting the neck finish to enable the preform internal collar and neck finish to remain free from any alteration during the blowing step. The mold around the preform neck finish extracts heat from the neck finish of the preform. There is included a step of inserting a fitment into the neck finish to firmly seat on the internal shoulder in the neck finish of the blown bottle, and the preferred fitment is a cup-shaped dosing fitment with a peripheral flange firmly seating on the shoulder.

Desirably, the fitment has bosses on its exterior surface which are compressed upon its insertion into the bottle to enhance the frictional engagement. The resultant dosing bottle comprises a container having a body portion with a sidewall, a bottom wall, an elongated neck finish with at least one external collar adjacent the lower end thereof, and a shoulder portion extending between the sidewall and the neck finish; the neck finish having an internal collar providing a shoulder adjacent the lower end thereof. A generally cup-shaped dosing fitment has a flange which is seated on the shoulder and friction fit into and sealing the lower portion of the neck finish from the body portion. A tube is seated in the dosing fitment and extends upwardly of the dosing member, and the wall of the tube having an aperture therein above the dosing member. The bottle includes a cup-shaped closure engaged on the neck finish of the blown bottle.

Preferably, the fitment has bosses on its periphery which are compressed upon insertion into the bottle to increase the frictional engagement.

BRIEF DESCRIPTION OF ATTACHED DRAWINGS

DETAILED DESCRIPTION OF THE PREFERRED EMBODIMENTS

Figure 1:
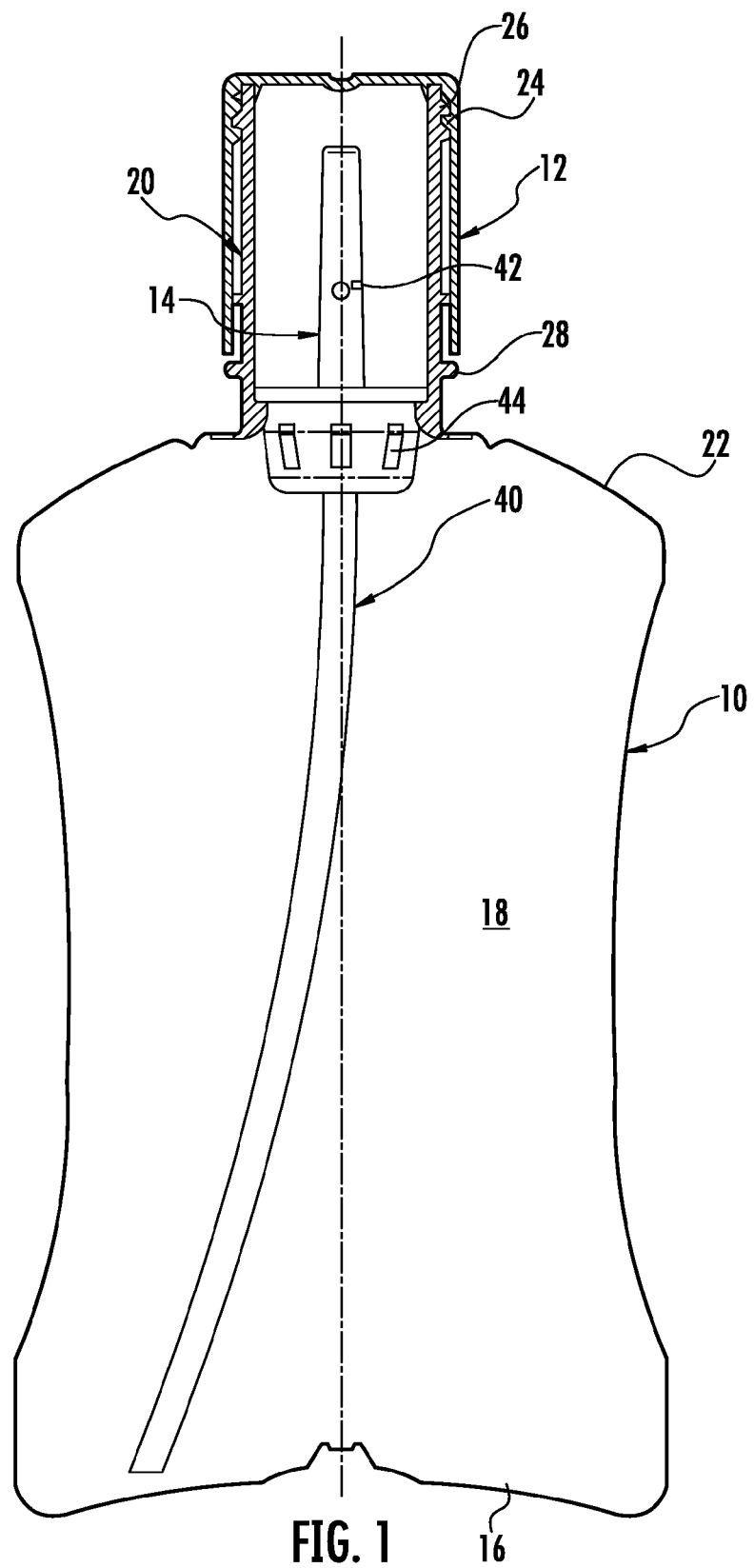
FIG. 1 is a cross sectional view of a dosing bottle embodying the present invention.
Figure 2:
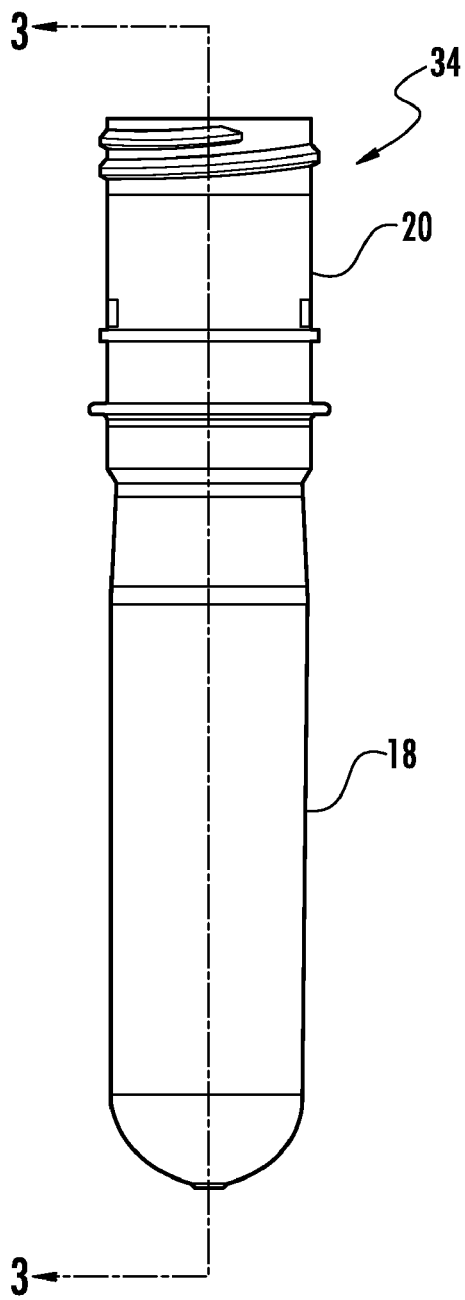
FIG. 2 is a side elevational view of the preform for the bottle of FIG. 1.
Figure 3:
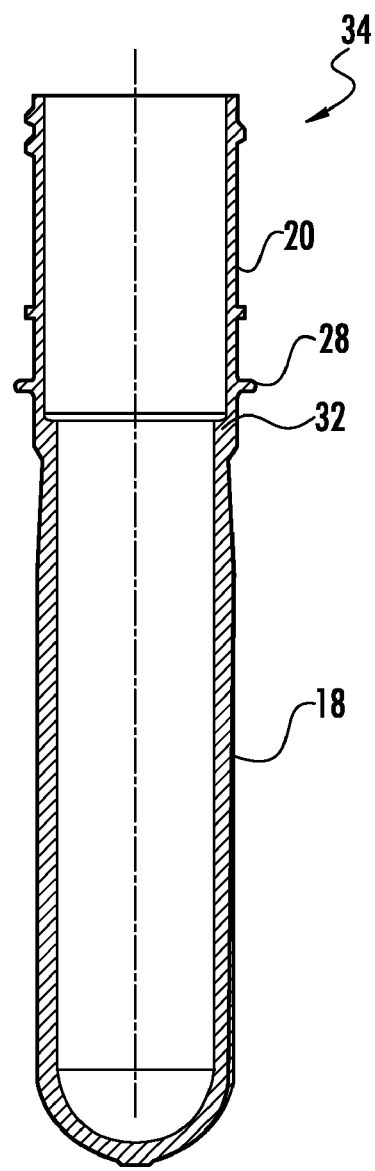
FIG. 3 is a cross sectional view of the preform.

Turning first to FIG. 1, therein illustrated is a dosing bottle embodying the present invention and comprised of the bottle generally designated by the numeral 10, the cap generally designated by the numeral 12, and the dosing fitment generally designated by the numeral 14. The bottle 10 has a base wall 16, a body 18, a neck finish 20 and a shoulder portion 22 extending upwardly from the peripheral wall of the body 18 to the neck finish 20.

The cap 12 has internal threads 24 which engage the external threads 26 on the neck finish 20 and there are two outwardly extending collars 28 on the peripheral surface of the neck finish 20.

Figure 4:
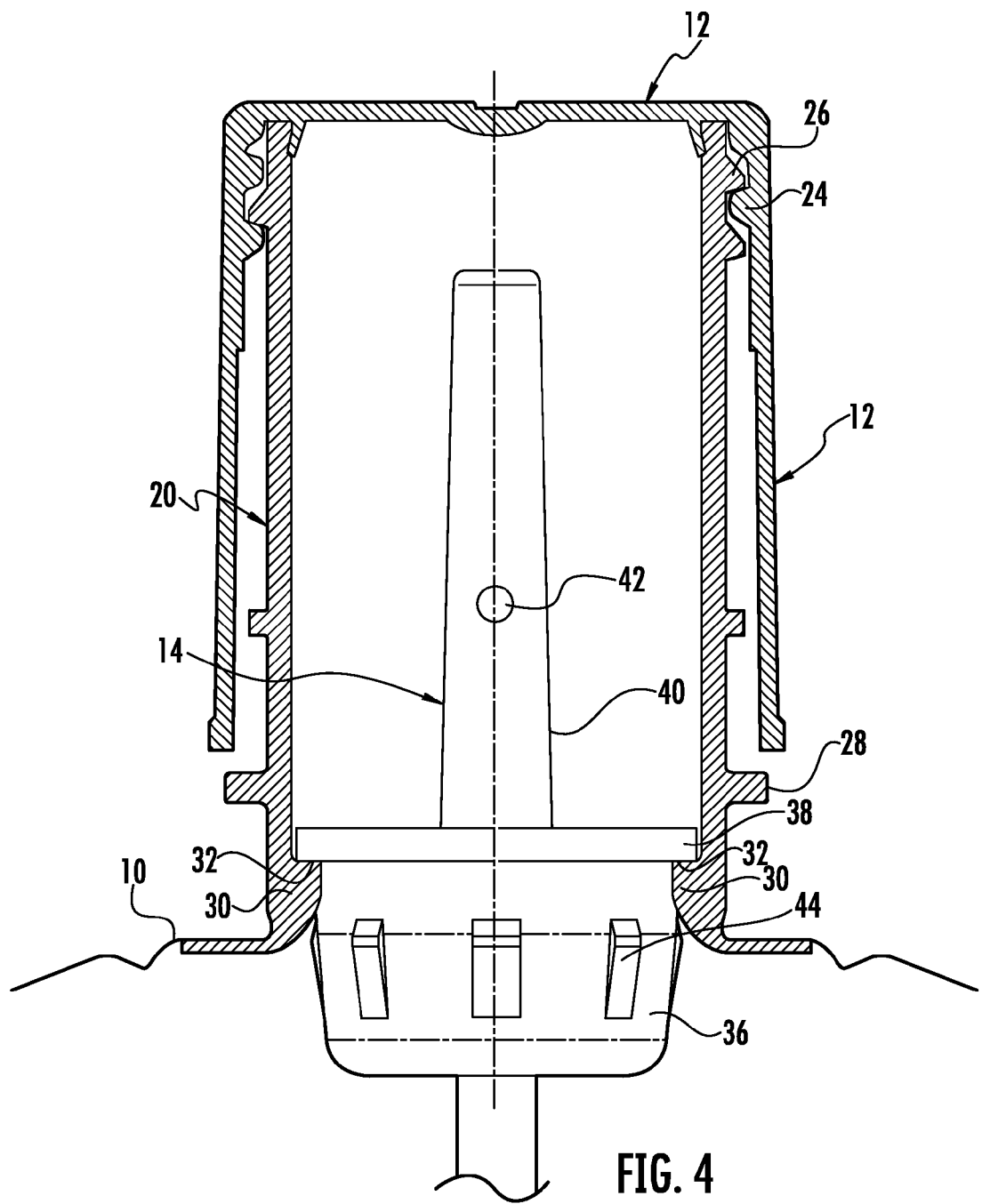
FIG. 4 is an enlarged fragmentary sectional view showing the dosing fitment frictionally engaged in the bottle.

As best seen in FIG. 4, the neck finish 20 includes an internal collar 30 adjacent the lower end thereof which provides an upwardly disposed horizontal shoulder 32.

The fitment 14 is cup-shaped with a peripheral wall 36 having a collar 38 thereabout. A feed tube 40 is integrally molded and extends upwardly above the fitment 14. Diametrically opposed apertures in the tube 40 allow excess fluid to flow therethrough and back into the body of liquid in the bottle. On the exterior of the peripheral wall 36 are small bosses 44 when placed in the bottle.

When the fitment 14 is inserted into the bottle 10 and pushed downwardly, the collar 38 seats on the shoulder 32 and the bosses 44 are compressed to provide frictional engagement of the fitment 14.

In use, the bottle 10 is filled with the liquid to be dispensed.

Figure 5:
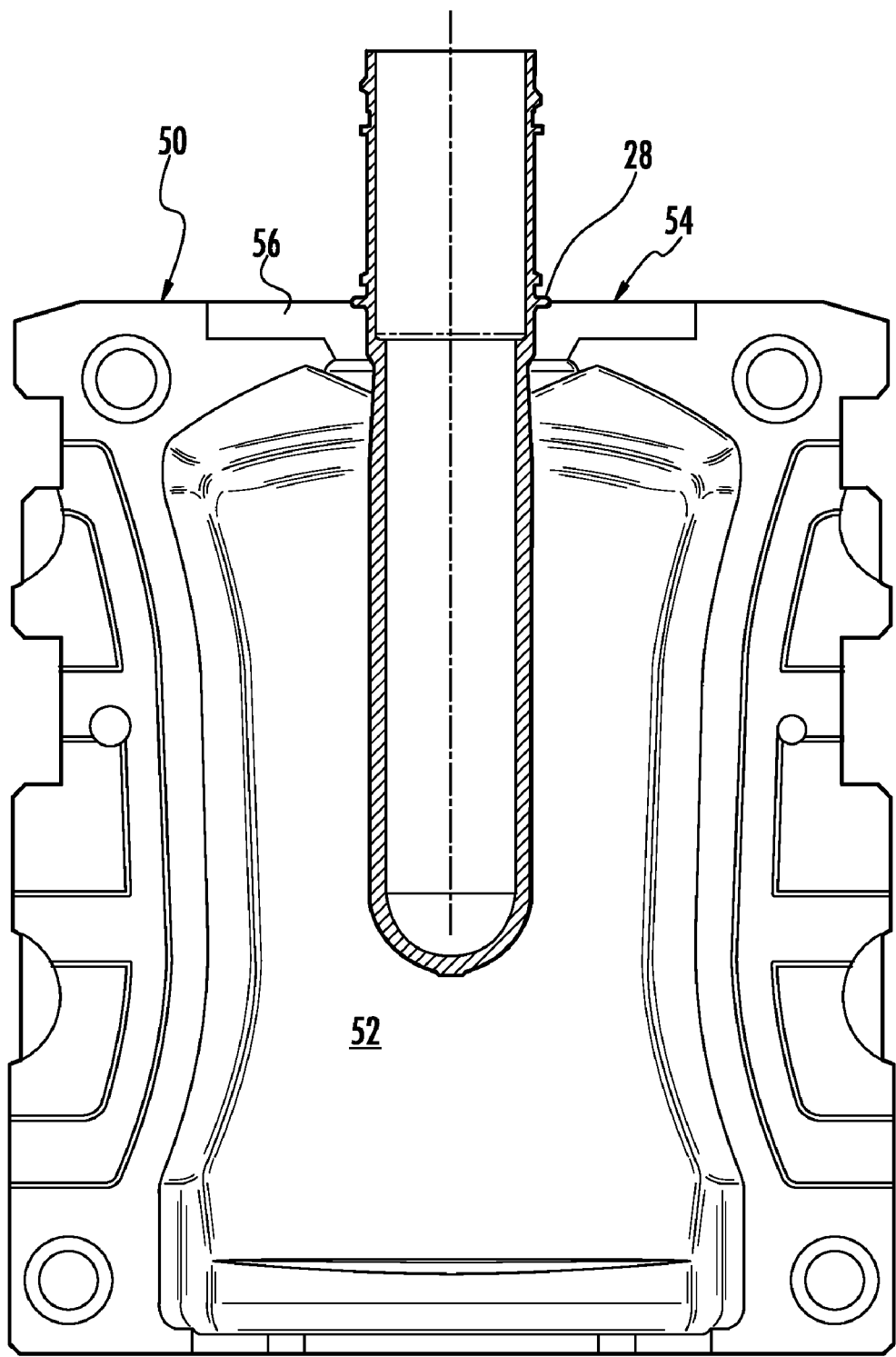
FIG. 5 is a sectional view of the bottle mold with the preform seated therein.

Turning now to FIG. 5, a mating pair of molds generally designated by the numeral 50 have a main cavity 52 and a neck finish cavity 54. Inserts 56 seats the neck finish cavity 54 so that, when air is introduced to blow the body portion of the preform into conformity with the inner surface of the bottle 10, the neck finish is not distorted.

The external collars 28 on the neck finish of the preform seat in a preform transfer unit and the lower collar seats on the mold 50 to position the preform 34.

Having thus described the invention, what is claimed is:

1. A method for making a dosing bottle comprising the steps of:
    injecting a synthetic resin into an injection mold to form a preform having an extended neck portion having a neck wall extending between an open end and a body portion, the body portion having a diameter and a body wall thicker than the neck wall, the preform including a peripheral internal shoulder located substantially at a transition between the extended neck portion and the body portion, and the preform including an outwardly extending collar located on the neck wall, wherein the body portion has an external localized reduction in diameter adjacent to outwardly extending collar, wherein the internal shoulder is located between the collar and the reduction in diameter, and wherein thicker body portions are located above and below the external localized reduction in diameter;
    removing the preform from the mold;
    heating the preform;
    placing the preform into a blow mold of the type including a cavity configured to form the body portion into a desired shape, the blow mold further including a support portion which includes a first support formation and a second support formation;
    supporting the preform at the outwardly extending collar with the first support formation and at the external reduction in diameter of the body wall with the second support formation to prevent movement of the neck portion into the cavity when the preform is pressurized, wherein the neck portion located between the collar and open end is outside of the cavity, and wherein the support portion cools the portion of the preform between the internal shoulder and the reduction in diameter; and
    pressurizing the preform while supporting the neck portion at the reduction in diameter to cause only the preform portions beyond the reduction in diameter to reduce in thickness and substantially conform to the cavity, wherein an internal collar engageable by a fitment is formed between the internal shoulder and the reduction in diameter.

2. The method of claim 1, wherein the extended neck portion includes threads formed adjacent to the open end and on less than half of the extended neck portion.

3. A method for making a bottle comprising the steps of:
    injecting a synthetic resin into an injection mold to form a preform having an extended neck portion having a neck wall joined to a body portion having an outside diameter, the extended neck portion having a neck wall and the body portion having a body wall thicker than the neck wall, and the preform including a peripheral internal shoulder located substantially at a transition between the extended neck portion and the body portion, wherein the body portion includes an external area having a reduction in the diameter adjacent to the internal shoulder, and wherein the reduction in diameter is surrounded above and below by thicker body portions;
    removing the preform from the mold;
    heating the preform;
    placing the preform into a blow mold of the type including a cavity configured to form the body portion into a desired shape, the mold further including a support formation adjacent to the cavity;
    supporting the preform at the reduction in the diameter with the support formation such that the neck portion is prevented from moving into the cavity when preform is pressurized, wherein the mold cools the portion of the preform between the internal shoulder and the reduction in diameter; and
    pressurizing the preform while supporting the neck portion at the reduction in diameter to cause only the body wall beyond the reduction in diameter to reduce in thickness and substantially conform to the cavity wherein an internal collar engageable by a fitment is formed between the internal shoulder and the reduction in diameter.

4. The method of claim 3, wherein the extended neck portion includes threads formed adjacent to the open end and on less than half of the extended neck portion.

5. A method for making a bottle comprising the steps of:
    injecting a synthetic resin into an injection mold to form a preform having an extended neck portion having a neck wall joined to a body portion, the body portion having a body wall thicker than the neck wall, and the preform including a peripheral internal shoulder located substantially at a transition between the extended neck portion and the body portion, wherein the body wall includes an external thinned wall portion adjacent to the internal shoulder, and wherein the external thinned wall portion is surrounded above and below by thicker body portions;
    removing the preform from the mold;
    heating the preform;
    placing the preform into a blow mold of the type including a cavity configured to form the body portion into a desired shape, the blow mold further including a support formation adjacent to the cavity;
    supporting the preform at the thinned wall portion with the support formation such that the neck portion is prevented from moving into the cavity when the preform is pressurized, wherein the mold cools the portion of the preform between the internal shoulder and the thinned wall portion; and
    pressurizing the preform while supporting the neck portion at the thinned wall portion to cause only the body wall beyond the thinned wall portion to reduce in thickness and substantially conform to the cavity wherein an internal collar is formed engageable by a fitment between the internal shoulder and the thinned wall portion.

6. The method of claim 5, comprising the step of sealing the neck of the preform from the cavity configured to form the body portion of the mold.

* * * * *